United States Patent
Iwai et al.

(10) Patent No.: US 9,628,980 B2
(45) Date of Patent: Apr. 18, 2017

(54) SUBSCRIBER SERVER, MONITORING SERVER, MOBILE TERMINAL, METHODS RELATED THERETO, AND COMPUTER READABLE MEDIUM

(71) Applicants: Takanori Iwai, Tokyo (JP); Toshiyuki Tamura, Tokyo (JP); Hajime Zembutsu, Tokyo (JP)

(72) Inventors: Takanori Iwai, Tokyo (JP); Toshiyuki Tamura, Tokyo (JP); Hajime Zembutsu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/383,743

(22) PCT Filed: Mar. 11, 2013

(86) PCT No.: PCT/JP2013/001563
§ 371 (c)(1),
(2) Date: Sep. 8, 2014

(87) PCT Pub. No.: WO2013/140743
PCT Pub. Date: Sep. 26, 2013

(65) Prior Publication Data
US 2015/0099506 A1    Apr. 9, 2015

(30) Foreign Application Priority Data
Mar. 23, 2012    (JP) ................. 2012-067229

(51) Int. Cl.
*H04W 8/20* (2009.01)
*H04W 8/04* (2009.01)
*H04W 88/08* (2009.01)

(52) U.S. Cl.
CPC ............. *H04W 8/20* (2013.01); *H04W 8/04* (2013.01); *H04W 88/08* (2013.01)

(58) Field of Classification Search
CPC ....... H04W 8/245; H04W 8/265; H04W 8/20; H04W 8/04; H04W 88/08; H04M 1/72525; H04M 2207/18; H04M 3/42178
See application file for complete search history.

(56) References Cited

U.S. PATENT DOCUMENTS

2003/0074443 A1    4/2003    Melaku et al.
2006/0146858 A1*   7/2006    Kim ................... H04W 72/005
                                                                370/432
(Continued)

FOREIGN PATENT DOCUMENTS

JP    11-313370    9/1999
JP    2011-525334    9/2011

OTHER PUBLICATIONS

WO 2011020405, Wang et al., Method, System and Transmission Distribution network element for indicating data-Distribution, date Feb. 24, 2011.*
WO 2012093433, Iwai et al., policy determination system used in mobile system e.g. long term evolution (LTE) system has determination unit that determines status control accoring to connected-idle ststus state of mobile terminal, dated Jul. 12, 2012.*
3GPP TS 29.328, V10.4.0, 3$^{rd}$ Generation Partnership Project; Technical Specification Group Core Network and Terminals; IP Multimedia (IM) Subsystem Sh interface; Signalling flows and message contents, Release 10, 7.6 Data, Annex B, Dec. 2011.
(Continued)

*Primary Examiner* — Ted Wang
(74) *Attorney, Agent, or Firm* — Finnegan, Henderson, Farabow, Garrett & Dunner, L.L.P.

(57) ABSTRACT

In one embodiment, a mobile terminal (200) transmits behavior data of the mobile terminal (200) to a monitoring server (700). The monitoring server (700) acquires the behavior data of the mobile terminal (200), and performs communication with a subscriber server (400) to update the subscriber data (410) regarding the mobile terminal (200) based on the behavior data. The subscriber server (400) updates a subscriber data (410) based on the communication with the monitoring server (700).

42 Claims, 7 Drawing Sheets

(56) References Cited

U.S. PATENT DOCUMENTS

| | | |
|---|---|---|
| 2008/0039032 A1 | 2/2008 | Haumont |
| 2009/0316656 A1 | 12/2009 | Zhao et al. |
| 2010/0151817 A1 | 6/2010 | Lidström et al. |
| 2011/0090870 A1 | 4/2011 | Rönneke et al. |
| 2011/0264766 A1 | 10/2011 | Ota et al. |
| 2011/0295996 A1* | 12/2011 | Qiu ................. G06F 9/505 709/224 |
| 2012/0093129 A1 | 4/2012 | Zhao et al. |
| 2012/0142278 A1* | 6/2012 | Wang ............ H04W 76/041 455/68 |
| 2012/0159151 A1* | 6/2012 | Janakiraman ...... H04L 43/028 713/153 |
| 2012/0165018 A1 | 6/2012 | Zhao et al. |
| 2012/0252517 A1* | 10/2012 | Karampatsis ...... H04W 4/005 455/515 |

OTHER PUBLICATIONS

3GPP TSG-SA2 Meeting #89, S2-120475, "Inactivity timer management function", NTT docomo and NEC, Vancouver, Canada, Feb. 2012.

3GPP TSG-SA2 Meeting #89, S2-120476, "Inactivity timer management function", NTT docomo and NEC, Vancouver, Canada, Feb. 2012.

International Search Report mailed Apr. 2, 2013 in corresponding International Application No. PCT/JP2013/001563.

Extended European Search Report mailed Nov. 27, 2015 by the European Patent Office in counterpart European Patent Application No. 13763835.9.

\* cited by examiner

SUBSCRIBER SERVER, MONITORING SERVER, MOBILE TERMINAL, METHODS RELATED THERETO, AND COMPUTER READABLE MEDIUM

CROSS-REFERENCE TO RELATED PATENT APPLICATIONS

This application is a National Stage Entry of International Application No. PCT/JP2013/001563, filed Mar. 11, 2013, which claims priority from Japanese Patent Application No. 2012-067229, filed Mar. 23, 2012. The entire contents of the above-referenced applications are expressly incorporated herein by reference.

TECHNICAL FIELD

The present invention relates to a mobile communication system, and more particularly, to update of subscriber data held in a subscriber server.

BACKGROUND ART

Patent literature 1 discloses measuring, by a mobile terminal or a network (i.e., a base station or a gateway), duration time of an inactive state during which the mobile terminal does not perform communication, and causing the mobile terminal to transition to a sleep mode when the duration time exceeds a predetermined expiration period. Patent literature 1 further discloses measuring, by a mobile terminal or a network (i.e., a base station or a gateway), a communication frequency of the mobile terminal, and changing the timer expiration period regarding the sleep mode transition based on the communication frequency of the mobile terminal. Patent literature 1 further discloses changing the timer expiration period regarding the sleep mode transition based on remaining battery power of the mobile terminal.

Further, Non-patent literature 1 and 2 disclose that subscriber data managed by a Home Subscriber Server (HSS) includes configuration data of a UE inactivity timer in a 3rd Generation Partnership Project (3GPP) mobile communication system. The UE inactivity timer is a timer that measures duration time of an inactive state during which user data regarding a mobile terminal is not transmitted or received. The UE inactivity timer is (re)started by a base station, and is used to determine the change of state of the mobile terminal from a CONNECTED state to an IDLE state. The configuration data of the UE inactivity timer held by the HSS is transmitted to the base station from the HSS through a Mobility Management Entity (MME) in response to attach of the mobile terminal, location registration update, a service request and the like.

The following are definitions of the terms "CONNECTED state" and "IDLE state" used in this specification and Claims. The "IDLE state" means a state in which a mobile terminal does not continuously transmit or receive control signals for session management and mobility management to or from a mobile core network, and radio resources in a radio access network have been released. The radio access network is, for example, UTRAN or E-UTRAN. The mobile core network is, for example, a General Packet Radio Service (GPRS) packet core or an Evolved Packet Core (EPC). One example of the IDLE state is an EPS Connection Management IDLE (ECM-IDLE) state and a Radio Resource Control IDLE (RRC_IDLE) state of the 3GPP. In the RRC_IDLE, radio resources in the Evolved Universal Terrestrial Radio Access Network (E-UTRAN) have been released.

Meanwhile, the "CONNECTED state" means a state in which, as in an ECM-CONNECTED state and an RRC_CONNECTED state of the 3GPP stated above, radio resources at least for transmitting and receiving control signals (control messages) for session management and mobility management between the mobile terminal and the mobile core network are secured in a radio access network, and such a connection is established as to be able to transmit and receive control signals (control messages) between the mobile terminal and the mobile core network. In short, the "CONNECTED state" is a state in which the mobile terminal is connected to the mobile core network so as to be able to at least transmit and receive the control signals (control messages) for the session management and the mobility management. In other words, the "CONNECTED state" does not require a state in which a data bearer is configured for transmitting and receiving user data between the mobile terminal and an external packet data network (PDN). The "CONNECTED state" can also be called an "ACTIVE state".

Typically, the mobile core network manages the location of a mobile terminal which is in the CONNECTED state on a cell by cell basis, and manages the location of a mobile terminal which is in the IDLE state in units of location registration areas (e.g., tracking areas, routing areas) including a plurality of cells. When moved from one location registration area to another location registration area, the mobile terminal which is in the IDLE state transmits a message indicating an update of the location registration area to the mobile core network. The mobile core network transmits, upon arrival of downlink traffic (downlink data or incoming voice call) to the mobile terminal which is in the IDLE state, a paging signal into a paging area defined based on the location registration area.

CITATION LIST

Patent Literature

[Patent Literature 1] Japanese Unexamined Patent Application Publication No. H11-313370

Non Patent Literature

[Non-Patent Literature 1] 3GPP S2-120475, "Inactivity timer management function", NTT docomo and NEC, 3GPP TSG-SA2 Meeting #89, Vancouver, Canada, 6-10 Feb. 2012

[Non-Patent Literature 2] 3GPP S2-120476, "Inactivity timer management function", NTT docomo and NEC, 3GPP TSG-SA2 Meeting #89, Vancouver, Canada, 6-10 Feb. 2012

SUMMARY OF INVENTION

Technical Problem

There are various types and various applications of mobile terminals connected to a mobile core network through a radio access network. The types of the mobile terminals include, for example, smartphones, tablets, and Machine Type Communication (MTC) devices. It is supposed that smartphones generally have different traffic characteristics depending on the applications that are installed. Further, the MTC devices are mounted on various devices including vending machines, gas meters, electric meters, vehicles, railway vehicles, environmental sensors, traffic sensors and the like. It is therefore supposed that the MTC devices have different traffic characteristics depending on its applications.

The inventors have studied about changing a configuration of radio control parameters based on the behavior of a mobile terminal such as traffic characteristics of the mobile terminal. The control of the UE inactivity timer, which is one of the radio control parameters, is described here. It is desirable that the behavior data of the mobile terminal can be collected by a monitoring server arranged outside the radio access network and the mobile core network. The monitoring server may be operated not only by a mobile network operator but also by an external service operator. As already described above, however, the configuration data of the UE inactivity timer may be managed by the HSS as the subscriber data. It is currently impossible to change the subscriber data managed by the HSS from an outside of the mobile core network.

Note that the subscriber data managed by the HSS is not limited to the UE inactivity timer stated above. The subscriber data includes, for example, a QoS Class (QCI) of a data bearer, an Access Point Name (APN), or an IP address of a mobile terminal. If the subscriber data can be changed based on the behavior of the mobile terminal collected by the monitoring server, operations of a mobile network adapted for the mobile terminal can be provided. It is currently impossible, however, to change these subscriber data from an outside of the mobile core network.

The present invention has been made based on the above study by the inventors, and aims to provide a subscriber server, monitoring server, mobile terminal, methods of controlling them, and program for allowing update of subscriber data managed by a subscriber server (e.g., HSS) from an outside of the mobile core network.

Solution to Problem

A first aspect includes a subscriber server being arranged in a mobile core network and managing subscriber data regarding a mobile terminal connected to the mobile core network through a radio access network. The subscriber server includes first and second communication units and an update unit. The first communication unit performs communication with a first server to update the subscriber data based on behavior data of the mobile terminal. The update unit updates the subscriber data based on the communication with the first server. The second communication unit transmits the subscriber data to a network node arranged in the mobile core network.

A second aspect includes a monitoring server. The monitoring server includes an acquiring unit and a communication unit. The acquiring unit acquires behavior data of a mobile terminal capable of being connected to a mobile core network through a radio access network. The communication unit performs communication with a subscriber server arranged in the mobile core network to update subscriber data regarding the mobile terminal based on the behavior data.

A third aspect includes a mobile terminal being connected to a mobile core network through a radio access network. The mobile terminal includes a transmission unit that transmits behavior data of the mobile terminal to a monitoring server. The behavior data is used to update subscriber data regarding the mobile terminal managed by a subscriber server arranged in the mobile core network.

A fourth aspect includes a method performed by a subscriber server. The subscriber server is arranged in a mobile core network and manages subscriber data regarding a mobile terminal connected to the mobile core network through a radio access network. The method according to this aspect includes the following (a) to (c):

(a) performing communication with a first server to update the subscriber data based on behavior data of the mobile terminal;

(b) updating the subscriber data based on the communication with the first server; and (c) transmitting the subscriber data to a network node arranged in the mobile core network.

A fifth aspect includes a method performed by a monitoring server. The method includes the following (a) and (b):

(a) acquiring behavior data of a mobile terminal capable of being connected to a mobile core network through a radio access network; and (b) performing communication with a subscriber server arranged in the mobile core network to update subscriber data regarding the mobile terminal based on the behavior data.

A sixth aspect includes a method performed by a mobile terminal being connected to a mobile core network through a radio access network. The method includes transmitting behavior data of the mobile terminal to a monitoring server. The behavior data is used to update subscriber data regarding the mobile terminal managed by a subscriber server arranged in the mobile core network.

A seventh aspect includes a program for causing a computer to execute the method according to the fourth aspect stated above.

An eighth aspect includes a program for causing a computer to execute the method according to the fifth aspect stated above.

A ninth aspect includes a program for causing a computer to execute the method according to the sixth aspect stated above.

Advantageous Effects of Invention

According to aspects of the present invention stated above, it is possible to provide a subscriber server, monitoring server, mobile terminal, methods of controlling them, and program for allowing update of subscriber data managed by a subscriber server (e.g., HSS) from an outside of the mobile core network.

DESCRIPTION OF EMBODIMENTS

Hereinafter, with reference to the drawings, specific embodiments to which the present invention is applied will be described in detail. Throughout the drawings, the identical and corresponding components are denoted by the same reference symbols, and overlapping description will be omitted as appropriate for the sake of clarification of description.

<First Embodiment>

Figure 1:
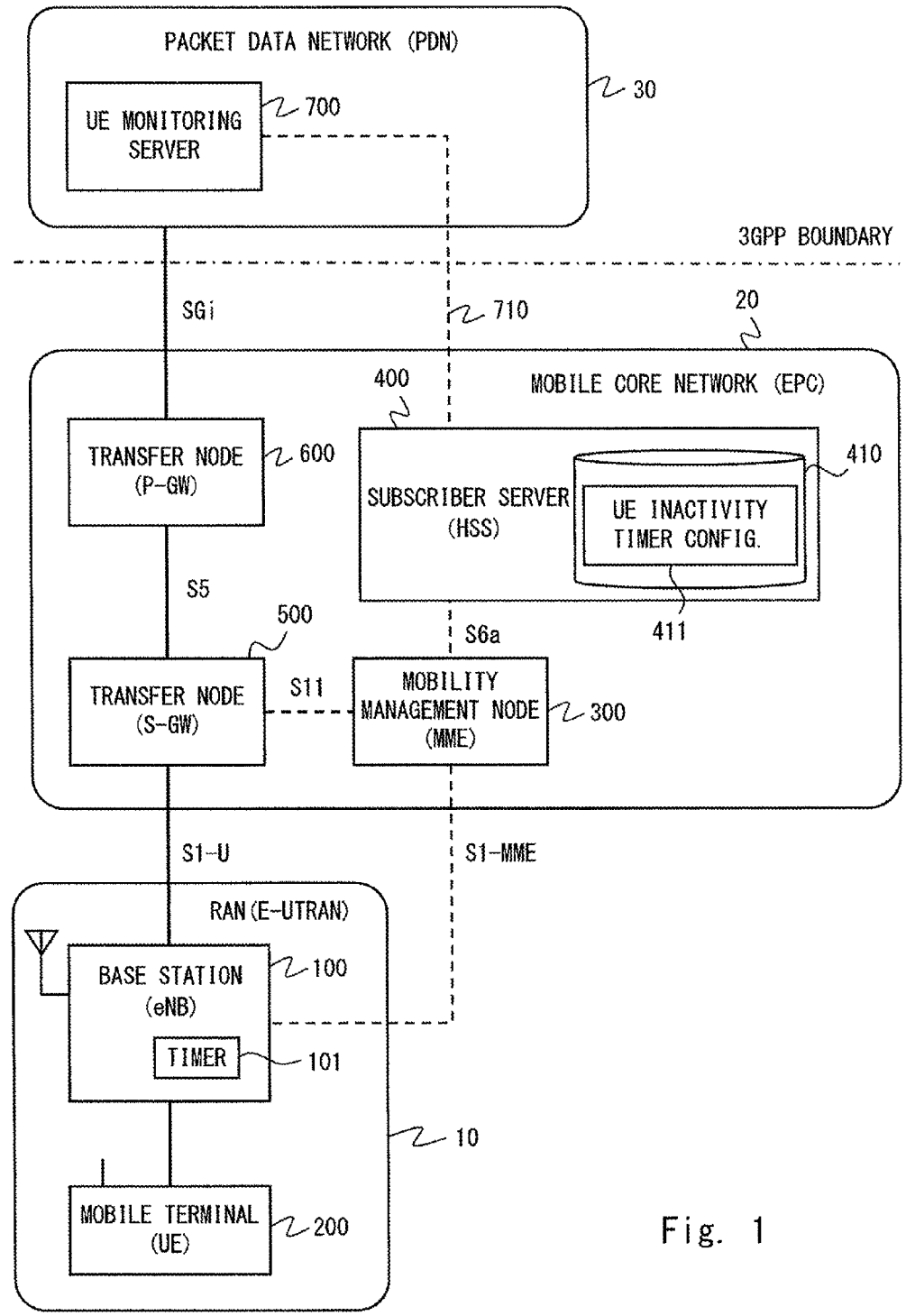
FIG. 1 is a block diagram showing a configuration example of a mobile communication system according to an embodiment of the present invention.

FIG. 1 is a block diagram showing a configuration example of a network including a mobile terminal 200, a subscriber server 400, and a UE monitoring server 700 according to this embodiment. The configuration example shown in FIG. 1 includes a radio access network (RAN) 10, a mobile core network 20, and a packet data network (PDN) 30. The basic configurations and functions of the RAN 10, the mobile core network 20, and the PDN 30 will be described first.

The RAN 10 includes a base station 100 and the mobile terminal 200. The base station 100 is connected to the mobile terminal 200 by means of a radio access technology. The mobile terminal 200 has a radio interface, is connected to the base station 100 by means of a radio access technology, and is connected to the core network 20 through the RAN 10 (i.e., base station 100). The RAN 10 is, for example, E-UTRAN or UTRAN, or the combination thereof. In the E-UTRAN, the base station 100 corresponds to an E-UTRAN NodeB (eNB). In the UTRAN, the base station 100 corresponds to the functions of a NodeB and a Radio Network Controller (RNC).

The base station 100 may include a UE inactivity timer 101. When there are a plurality of mobile terminals 200, the base station 100 may include UE inactivity timers 101 each associated with a respective one of the mobile terminals 200. The UE inactivity timer 101 is started by the base station 100, and is used to determine the change of state of the mobile terminal 200 from a CONNECTED state to an IDLE state.

The mobile core network 20 is a network managed by an operator that provides a mobile communication service. The mobile core network 20 is, for example, an EPC in an Evolved Packet System (EPS), a GPRS packet core in a Universal Mobile Telecommunications System (UMTS), or the combination thereof. The mobile core network 20 has a control plane function including bearer management and mobility management of the mobile terminal 200 and a user plane function including transfer of user data sent between the mobile terminal 200 and the external PDN 30. The mobile core network 20 shown in FIG. 1 includes a mobility management node 300 and the subscriber server 400 as control plane entities. Further, the mobile core network 20 includes transfer nodes 500 and 600 as user plane entities.

The mobility management node 300 performs mobility management and bearer management of the mobile terminal 200 (e.g., bearer establishment, bearer modification, bearer release). In the case of the UMTS, for example, the mobility management node 300 has control plane functions of a Serving GPRS Support Node (SGSN). Further, in the case of the EPS, the mobility management node 300 has a Mobility Management Entity (MME) function. The mobility management node (e.g., MME) 300 is connected to a plurality of base stations (e.g., eNBs) 100 with a control interface (e.g., S1-MME interface), is connected to the transfer node (e.g., Serving Gateway (S-GW)) with a control interface (e.g., S11 interface), and is also connected to a subscriber server (e.g., Home Subscriber Server (HSS)) with a control interface (e.g., S6a interface). The mobility management node (e.g., MME) 300 processes Non-Access Stratum (NAS) signals sent between the mobile terminal 200 and the mobile core network 20. As an example, when the mobile terminal 200 attaches to the mobile core network 20, the mobility management node 300 acquires subscriber data (or subscriber information) of the mobile terminal 200 from the subscriber server 400, generates a UE context including the subscriber data, and requests the base station 100 and the transfer node 500 to set up a bearer based on the UE context.

The subscriber server 400 manages a subscriber data 410 regarding the mobile terminal 200. In the case of the UMTS, for example, the subscriber server 400 has functions of a Home Location Register (HLR). In the case of the EPS, the subscriber server 400 has functions of an HSS. The subscriber data managed by the subscriber server (e.g., HSS) 400 includes, for example, QoS information, information regarding a PDN to which the mobile terminal 200 can connect, the IP address of the mobile terminal 200 and the like. The QoS information includes, for example, QoS parameters of a data bearer (e.g., QCI). The information regarding the PDN includes, for example, an APN indicating the name of the PDN, or the Internet Protocol (IP) address of the PDN. Further, the subscriber data may include radio control parameters of the RAN 10 regarding the mobile terminal 200. One example of the radio control parameters is a configuration data 411 of the UE inactivity timer 101. The subscriber server 400 transmits and receives control signals to and from the mobility management node 300 upon attach of the mobile terminal 200, location update, a service request and the like to supply the subscriber data of the mobile terminal 200 to the mobility management node 300, and acquires information of the mobility management node 300 where the mobile terminal 200 is currently registered.

The transfer node 500 is connected to the base station 200 with a user plane interface (e.g., S1-U interface), transmits downlink user data to the base station, and receives uplink user data from the base station. In the case of the UMTS, for example, the transfer node 500 has user plane functions of an SGSN. In the case of the EPS, the transfer node 500 has an S-GW function.

The transfer node 600 is connected to the PDN 30 with a user plane interface (e.g., SGi interface) and operates as a gateway to the PDN 30. The transfer node 600 performs filtering of data flow (i.e., packet flow) and enforcement of the QoS policy to the data flow. In the case of the UMTS, for example, the transfer node 600 has a Gateway GPRS Support Node (GGSN) function. Further, in the case of the EPS, the transfer node 600 has a PDN Gateway (P-GW) function.

The PDN 30 includes a network or a node with which the mobile terminal 200 communicates. The PDN 30 includes a gateway (not shown) being connected to the transfer node 600 with the interface (e.g., SGi interface). User data packets (e.g., IP packets) sent between the PDN 30 and the mobile terminal 200 are transferred transparently through the RAN 10 and the mobile core network 20. The node arranged in the PDN 30 and the mobile terminal 200 thus can communicate transparently on an application layer. In the example shown in FIG. 1, the PDN 30 includes the UE monitoring server 700.

In the following description, the mobile terminal 200, the subscriber server 400, and the UE monitoring server 700 according to this embodiment will be described further in detail. The mobile terminal 200 transmits behavior data of the mobile terminal 200 to the UE monitoring server 700. The behavior data is used to update the subscriber data 410 regarding the mobile terminal 200 based on the communication between the UE monitoring server 700 and the subscriber server 400.

The mobile terminal 200 may transmit the behavior data to the UE monitoring server 70 by means of transparent communication on a layer, identical to or superior to an IP layer, which is not terminated by the RAN 10 and the mobile core network 20. The mobile terminal 200 may transmit, for example, the behavior data to the UE monitoring server 70 by means of the transparent communication on the application layer. In this way, the load of the RAN 10 and the mobile core network 20 can be reduced and there is no need to add the function (i.e., behavior data processing) to the RAN 10 and the mobile core network 20. The transmission of the behavior data from the mobile terminal 200 to the UE monitoring server 700 may be performed through the RAN 10 and the mobile core network 20. Alternatively, the behavior data may be transmitted not through the RAN 10 and the mobile core network 20 but through, for example, a wireless local area network (wireless LAN) and the Internet.

The UE monitoring server 700 communicates with the subscriber server 400 in order to update the subscriber data 410 of the mobile terminal 200 based on the behavior data acquired from the mobile terminal 200. In short, the UE monitoring server 700 exchanges control signals with the subscriber server 400. For this communication, a new interface (reference point) 710 is defined between the UE monitoring server 700 and the subscriber data 410. The UE monitoring server 700 may transmit to the subscriber server 400 an update request message of the subscriber data 410 determined based on the behavior data by means of the communication using the interface (reference point) 710. Alternatively, the UE monitoring server 700 may transmit the behavior data to the subscriber data 410 by means of the communication using the interface (reference point) 710. In the former case, the subscriber server 400 may modify the subscriber data of the mobile terminal 200 so that the subscriber data matches with the updated contents indicated by the update request message. In the latter case, the subscriber server 400 may modify the subscriber data based on the behavior data received from the UE monitoring server 700.

The behavior data transmitted from the mobile terminal 200 is required to be efficient for updating the subscriber data 410 regarding the mobile terminal 200. The behavior data includes, for example, at least one of (a) data indicating the communication frequency of the mobile terminal 200, (b) data indicating a correspondent network or correspondent node that is arranged in the PDN 30 and communicates with the mobile terminal 200, (c) data indicating a protocol used to communicate with the correspondent network or the correspondent node arranged in the PDN 30, (d) data indicating an application program installed in the mobile terminal 200, (e) data indicating an application program activated in the mobile terminal 200, and (f) data indicating an amount of communication traffic of the mobile terminal 200.

The data (a) indicating the communication frequency of the mobile terminal 200 is effective, for example, when at least one of the configuration data 411 of the UE inactivity timer 101 and configuration data of a DRX inactivity timer is managed as the subscriber data 410. As already described above, the UE inactivity timer 101 is started by the base station 100, and is used to determine the change of state of the mobile terminal 200 from the CONNECTED state to the IDLE state. The base station 100 (re)starts the UE inactivity timer of the mobile terminal 200 when scheduling downlink or uplink radio resources to the mobile terminal 200, for example. Instead or in combination therewith, the base station 100 may (re)start the UE inactivity timer of the mobile terminal 200 in response to at least one of reception of downlink data for the mobile terminal 200, transmission of an uplink transmission grant (Uplink Grant) to the mobile terminal 200, transmission of a paging message to the mobile terminal 200, and reception of a radio resource allocation request from the mobile terminal 200, for example.

Meanwhile, the DRX inactivity timer is managed by the mobile terminal 200 which is in the CONNECTED state, and defines an ON-duration in the CONNECTED state. To be more specific, the mobile terminal 200 (re)starts the DRX inactivity timer upon reception of the scheduling. The duration until the DRX inactivity timer expires is called an ON-duration. In the ON-duration, the mobile terminal 200 continuously receives all the sub-frames. When the DRX inactivity timer expires, the mobile terminal 200 makes a transition to a DRX cycle (specifically, short DRX cycle). The DRX inactivity timer measures the inactive period of time until the mobile terminal 200 which is in the CONNECTED state (i.e., RRC_CONNECTED state) makes a transition from a continuous reception state to a DRX state.

In general, the mobile terminal 200 that has completed the communication immediately makes a transition to the IDLE state, and radio resources of the RAN 10 are released and there is no need to perform handover processing of the mobile terminal 200, thereby reducing the load of the RAN 10 and the core network 20. However, when the mobile terminal 200 repeats the transition between the IDLE state and the CONNECTED state, the number of control signals that should be processed by the core network 20 increases, which leads to a problem of an increase in the load of the core network 20. Therefore, when the communication frequency of the mobile terminal 200 is high, the UE monitoring server 700 and the subscriber server 400 may update the configuration data so as to increase the expiration period of the UE inactivity timer of the terminal. This increases the time during which the mobile terminal 200 remains in the CONNECTED state. It is therefore expected that it is possible to suppress the increase in the number of control signals that should be processed by the core network 20, which is caused due to the repeat of the CONNECTED-IDLE transition of the mobile terminal 200.

When the time during which the mobile terminal 200 remains in the CONNECTED state increases, time during which the mobile terminal 200 is active increases, resulting in an increase in the battery consumption of the mobile terminal 200. In such a case, the DRX cycle of the mobile terminal 200 may be set longer. It is therefore possible to reduce the battery consumption of the mobile terminal 200. Alternatively, the DRX inactivity timer of the mobile terminal 200 may be set shorter. The mobile terminal 200 then immediately makes a transition to the DRX state, and time during which the mobile terminal 200 remains in the continuous reception state can be shortened, thereby reducing the power consumption in the mobile terminal 200 which is in the CONNECTED state. Further, the DRX cycle of the mobile terminal 200 may be set longer and the DRX inactivity timer of the mobile terminal 200 may be set shorter. It is therefore possible to further enhance the effect of reducing the power consumption in the mobile terminal 200.

The data (b) indicating the correspondent network or the correspondent node arranged in the PDN 30 is effective, for example, when at least one of the QoS parameters of a bearer and information regarding the PDN to which the mobile terminal 200 can connect is managed as the subscriber data 410. As one example, the UE monitoring server 700 and the subscriber server 400 may change the QoS parameters of a bearer so as to increase the priority of the traffic of the mobile terminal 200 depending on the correspondent network or the correspondent node with which the mobile terminal 200 communicates on the IP layer or the application layer. Further, the UE monitoring server 700 and the subscriber server 400 may change the information regarding the PDN to which the mobile terminal 200 can connect so as to select a PDN having a short distance (a small number of hops) to the correspondent network or the correspondent node with which the mobile terminal 200 communicates on the IP layer or the application layer.

The above behavior data (c) to (f) are also effective when at least one of the configuration data of the UE inactivity timer, the configuration data of the DRX inactivity timer, the QoS parameters of a bearer, and information regarding the PDN to which the mobile terminal 200 can connect is managed as the subscriber data 410. As one example, the UE monitoring server 700 and the subscriber server 400 may change the configuration data of the UE inactivity timer according to the communication frequency characteristics of the application program activated (or installed) in the mobile terminal 200. As another example, when an application program corresponding to a specific service is installed in the mobile terminal 200, the UE monitoring server 700 and the subscriber server 400 may update the subscriber data 410 so as to select the QoS parameters or the PDN corresponding to the specific service.

Figure 2:
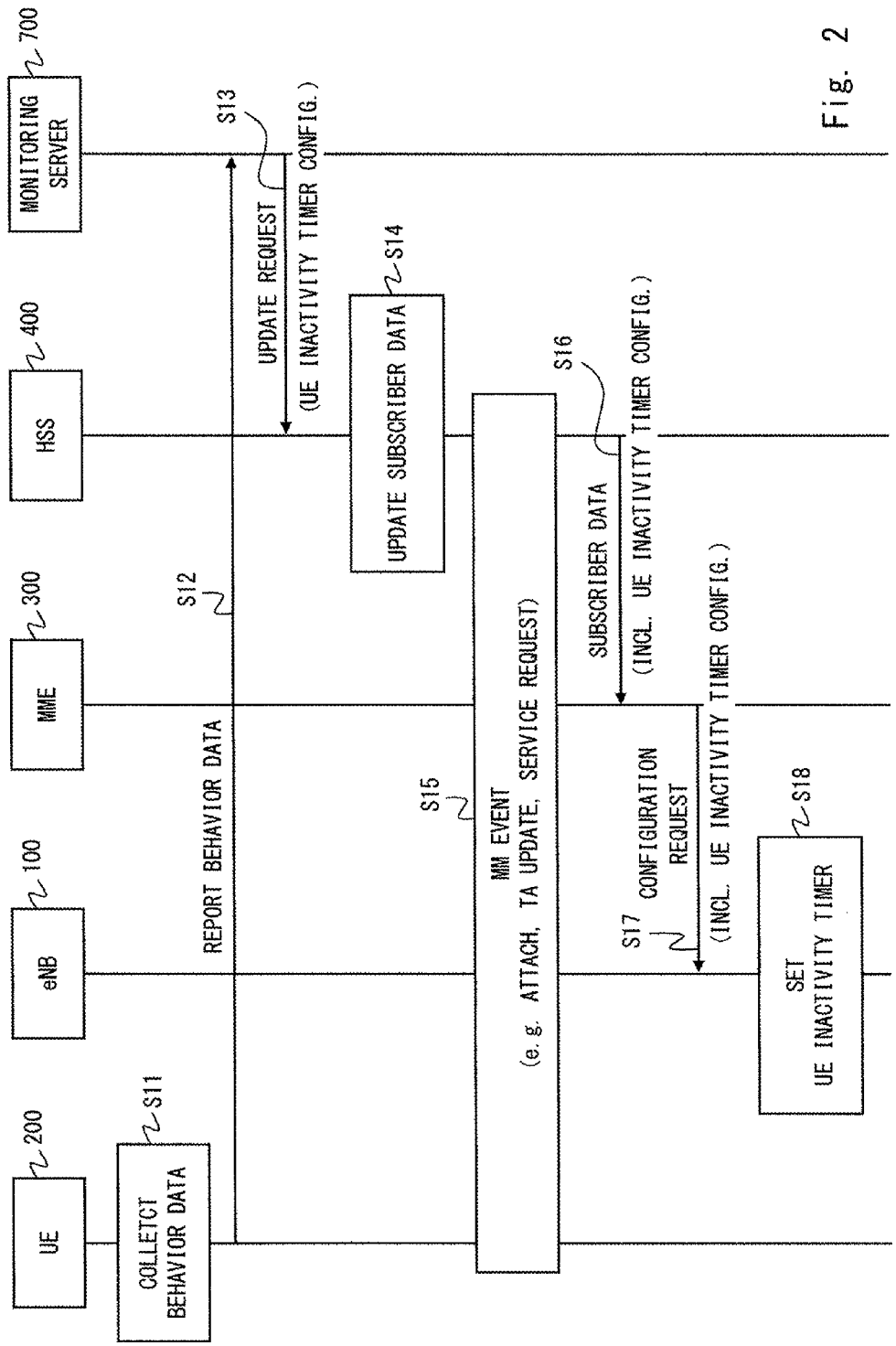
FIG. 2 is a sequence diagram showing an operation of a mobile communication system according to an embodiment of the present invention.

FIG. 2 is a sequence diagram showing one example of the communication to update the subscriber data 410 according to this embodiment. In step S11, the mobile terminal 200 collects the behavior data of the mobile terminal 200. In step S12, the mobile terminal 200 transmits the behavior data to the UE monitoring server 700. In step S13, the UE monitoring server 700 communicates with the subscriber server 400 to update the subscriber data 410 regarding the mobile terminal 200 based on the behavior data. In the example shown in FIG. 2, the UE monitoring server 700 transmits to the subscriber server 400 an update request of the subscriber data 410. The update request includes configuration data of the UE inactivity timer 101 (i.e., expiration period of the timer). In step S14, the subscriber server 400 updates the subscriber data 410 regarding the mobile terminal 200 based on the signaling in step S13. In the example shown in FIG. 2, the subscriber server 400 changes the configuration data of the UE inactivity timer 101 regarding the mobile terminal 200 to a value indicated by the update request from the UE monitoring server 700.

Steps S15 to S18 in FIG. 2 show a procedure for setting the UE inactivity timer 101 as one example of the scenario in which the subscriber data 410 of the mobile terminal 200 is utilized. To be more specific, in step S15, some mobility management event is performed such as attach of the mobile terminal 200 to the mobile core network 20, update of the tracking area of the mobile terminal 200, or a service request from the mobile terminal 200. In step S16, by signaling of the subscriber server 400 and the mobility management node 300 associated with the mobility management event in step S15, the subscriber data 410 of the mobile terminal 200 is transmitted to the mobility management node 300. In the example shown in FIG. 2, the subscriber data 410 includes configuration data of the UE inactivity timer 101. In step S17, by signaling of the base station 100 and the mobility management node 300 associated with the mobility management event in step S15, a configuration request including configuration data of the UE inactivity timer 101 is transmitted to the base station 100. In step S18, the base station 100 sets the UE inactivity timer 101 according to the configuration data received from the mobility management node 300.

Figure 3:
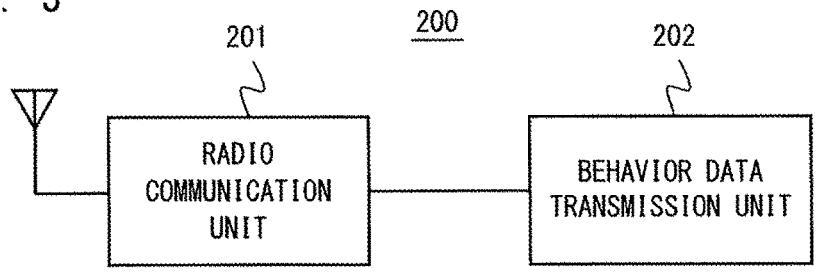
FIG. 3 is a block diagram showing a configuration example of a mobile terminal according to an embodiment of the present invention.

Described below is a configuration example of the mobile terminal 200, the UE monitoring server 700, and the subscriber server 400. FIG. 3 is a block diagram showing a configuration example of the mobile terminal 200. The radio communication unit 201 is connected to the base station 100 by means of a radio access technology and is connected to the mobile core network 20 through the base station 100. The behavior data transmission unit 202 transmits the behavior data to the UE monitoring server 700 arranged in the PDN 30. The behavior data transmission unit 202 communicates with the PDN 30 transparently on the application layer through the RAN 10 and the mobile core network 20 by using the radio communication unit 201. The behavior data transmission unit 202 may transmit the behavior data not through the RAN 10 and the mobile core network 20 but through, for example, a wireless LAN, a wired LAN, the Internet, or the combination thereof. The behavior data may be transmitted through another device (e.g., personal computer). The behavior data may be transmitted periodically or may be transmitted in response to the detection of a new behavior such as installing of a new application program. The behavior data may be transmitted in response to a predetermined event such as connection of the mobile terminal 200 to the personal computer or connection of a charging cable to the mobile terminal 200.

The processing performed by the behavior data transmission unit 20 may be implemented using a semiconductor processing device including an Application Specific Integrated Circuit (ASIC). Further, the processing may be implemented by causing a computer system including at least one processor (e.g., microprocessor, MPU, Digital Signal Processor (DSP)) to execute a program. To be more specific, one or a plurality of programs including instructions to cause the computer system to execute the algorithm regarding the mobile terminal 200 described with reference to FIGS. 1 to 3 may be created, and this program may be supplied to the computer.

The program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Figure 4:
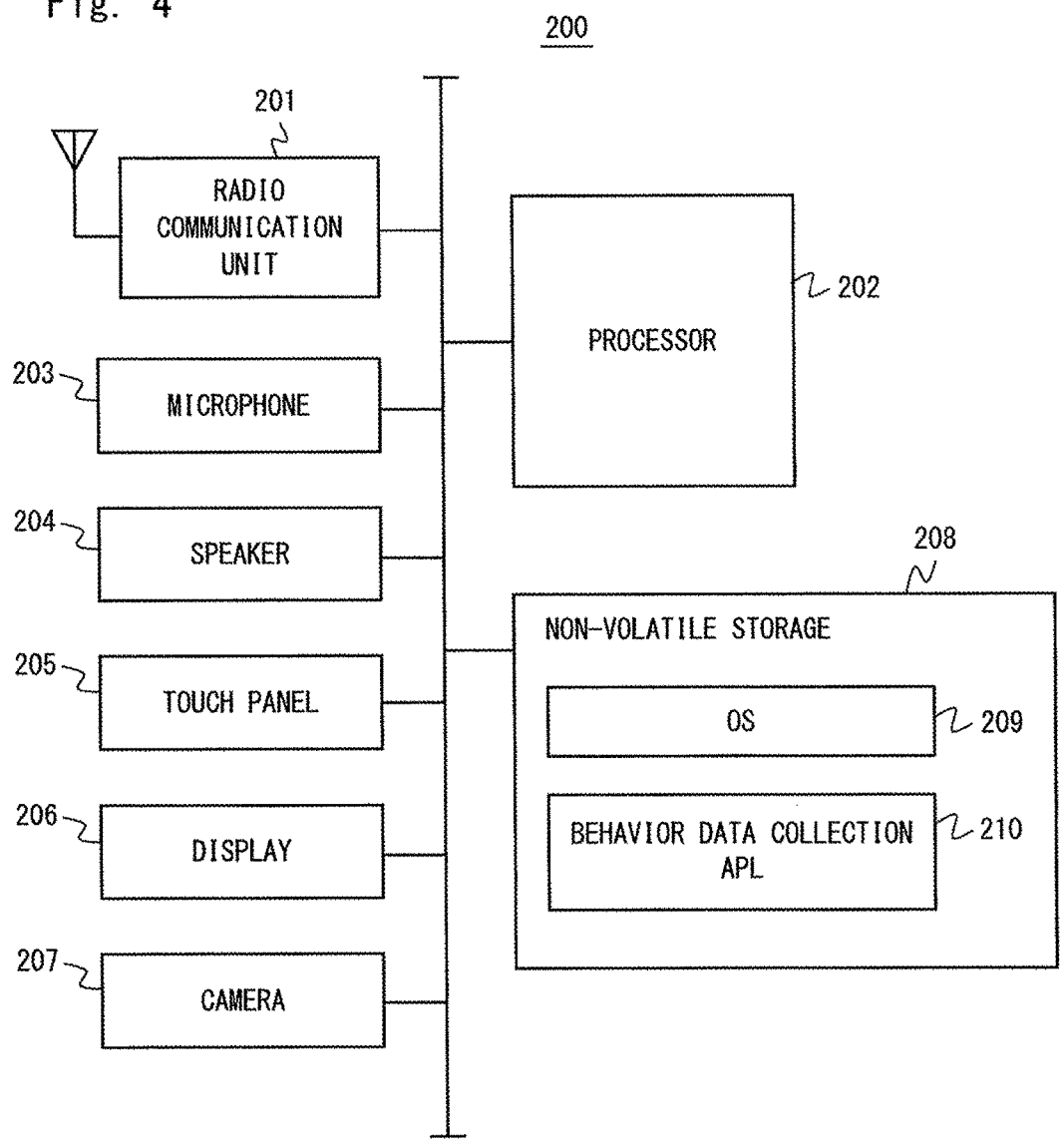
FIG. 4 is a block diagram showing another configuration example of a mobile terminal according to an embodiment of the present invention.

FIG. 4 is a block diagram showing a configuration example when the mobile terminal 200 is fabricated using a computer system. The example shown in FIG. 4 includes a microphone 203, a speaker 204, a touch panel 205, a display 206, and a camera 207 as specific examples of an input device and an output device. A processor 202 performs control, monitoring, and information processing of the communication terminal 200. The processor 202 includes at least one processor (e.g., Micro Processing Unit (MPU), microcontroller). An operating system (OS) 209 and a behavior data collection application program 210 stored in a non-volatile storage 208 (e.g., flash memory or hard disc drive) are loaded to a RAM in the processor 202. The processor 202 executes the OS 209 and the application program 210, thereby implementing the function of the behavior data transmission unit 202 shown in FIG. 2.

Figure 5:
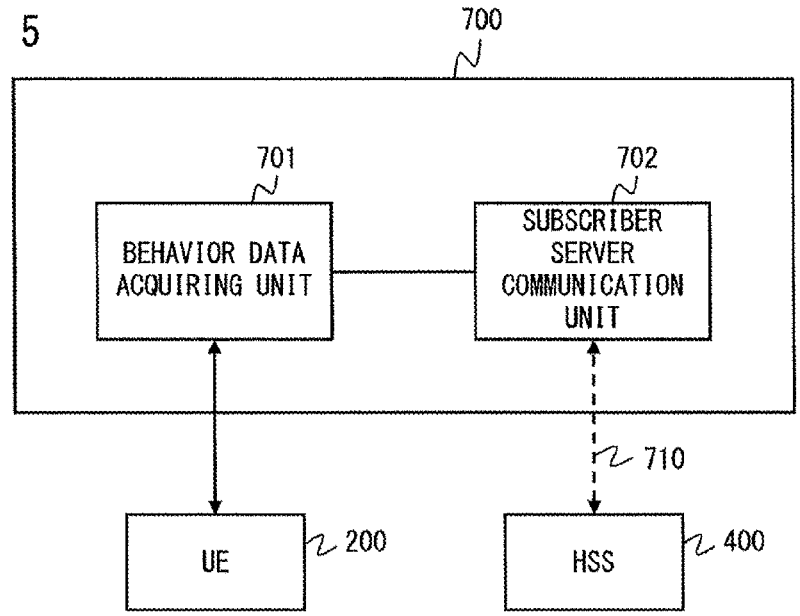
FIG. 5 is a block diagram showing a configuration example of a monitoring server according to an embodiment of the present invention.

FIG. 5 is a block diagram showing a configuration example of the UE monitoring server 700. A behavior data acquiring unit 701 acquires the behavior data of the mobile terminal 200. A subscriber server communication unit 702 communicates with the subscriber server 400 using the new interface (reference point) 710 to update the subscriber data 410 regarding the mobile terminal 200 based on the behavior data.

Figure 6:
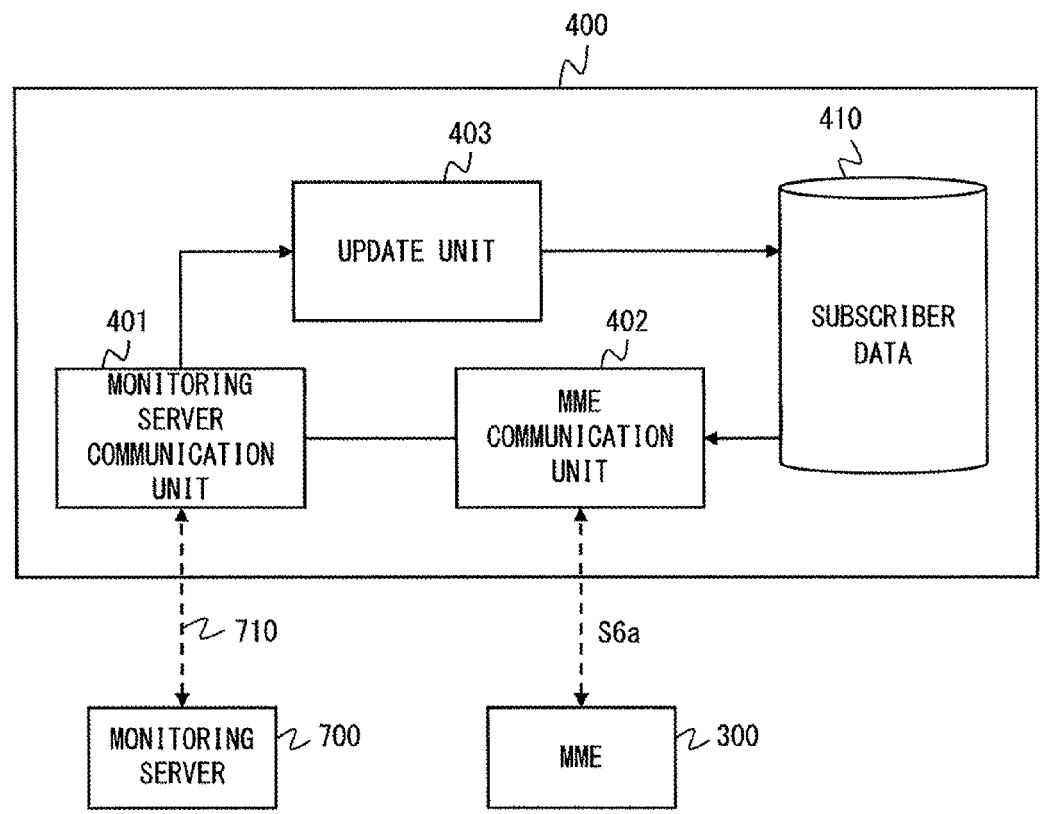
FIG. 6 is a block diagram showing a configuration example of a subscriber server according to an embodiment of the present invention.

FIG. 6 is a block diagram showing a configuration example of the subscriber server 400. A monitoring server communication unit 401 communicates with the UE monitoring server 700 using the new interface (reference point) 710 to update the subscriber data 410 based on the behavior data of the mobile terminal 200. An update unit 403 updates the subscriber data 410 based on the communication with the UE monitoring server 700. An MME communication unit 402 performs signaling with the mobility management node 300 in response to an event such as attach of the mobile terminal 200, update of the location registration area (e.g., tracking area) of the mobile terminal 200, or a service request from the mobile terminal 200, for example, and transmits the subscriber data 410 to the mobility management node 300.

The UE monitoring server 700 and the subscriber server 400 shown in FIGS. 5 and 6 may also be implemented by causing a computer system including at least one processor to execute a program. Specifically, the computer may be provided with one or a plurality of programs including instructions that causes the computer system to execute the algorithm regarding the UE monitoring server 700 described with reference to FIGS. 1, 2, and 4. Further, the computer may be provided with one or a plurality of programs including instructions that causes the computer system to execute the algorithm regarding the subscriber server 400 described with reference to FIGS. 1, 2, and 5.

As described above, according to the mobile terminal 200, the UE monitoring server 700, and the subscriber server 400 in this embodiment, by using the interface 710 between the UE monitoring server 700 and the subscriber server 400, the subscriber data 410 managed by the subscriber server 400 can be updated from outside of the mobile core network 20 based on the behavior data of the mobile terminal 200.

<Other Embodiments>

Figure 7:
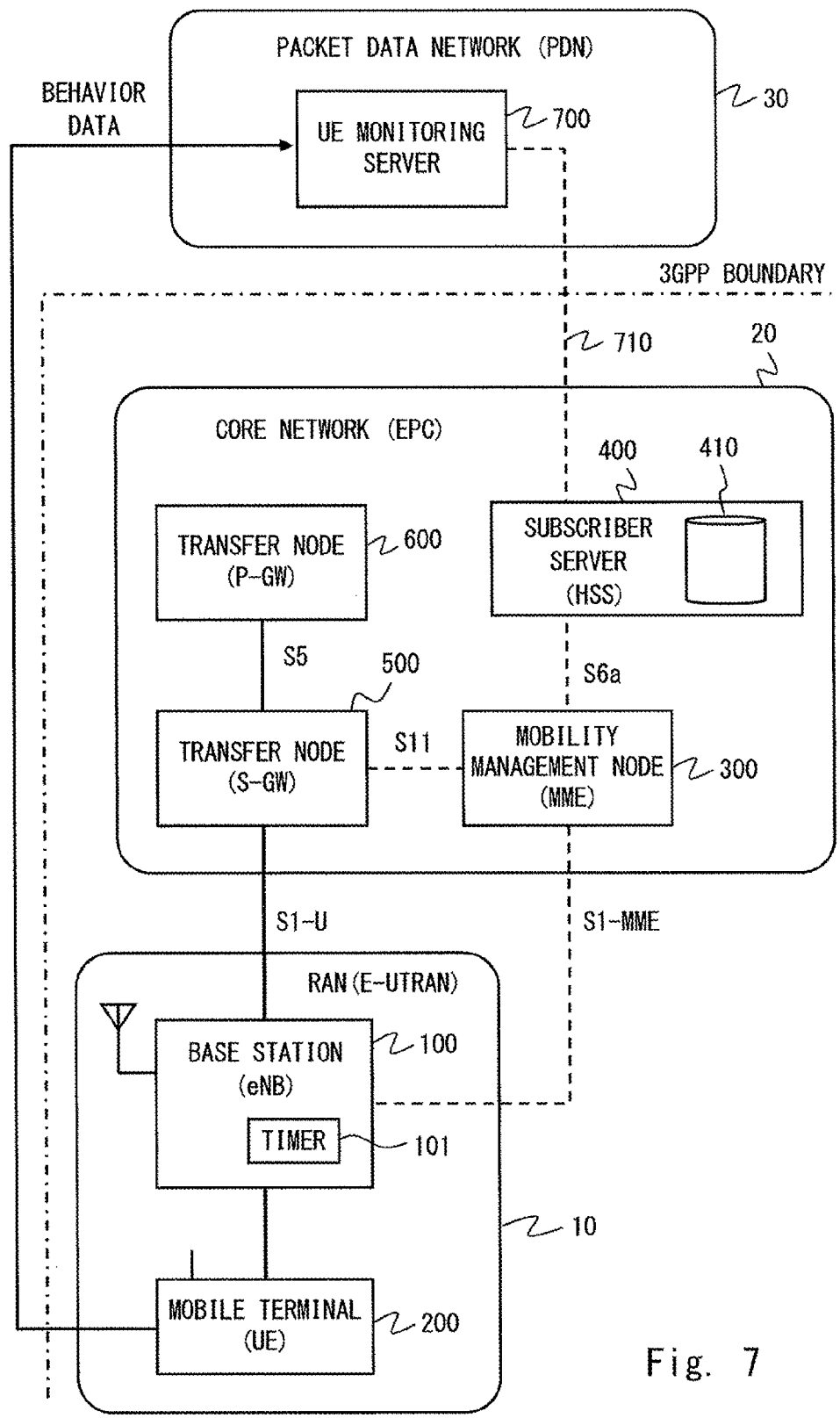
FIG. 7 is a block diagram showing a configuration example of a mobile communication system according to an embodiment of the present invention.

FIG. 1 shows the example in which the behavior data is transmitted from the mobile terminal 200 to the UE monitoring server 700 through the RAN 10 and the mobile core network 20. As already stated above, however, as shown in FIG. 7, the behavior data may be transmitted without the intervention of the RAN 10 and the mobile core network 20.

Further, FIG. 1 exemplifies the entities of the EPS (i.e., E-UTRAN and EPC). As already stated above, however, the network configuration example shown in FIG. 1 may be a UMTS network, or may be changed to a network in which the EPS and the UMTS are combined.

Figure 8:
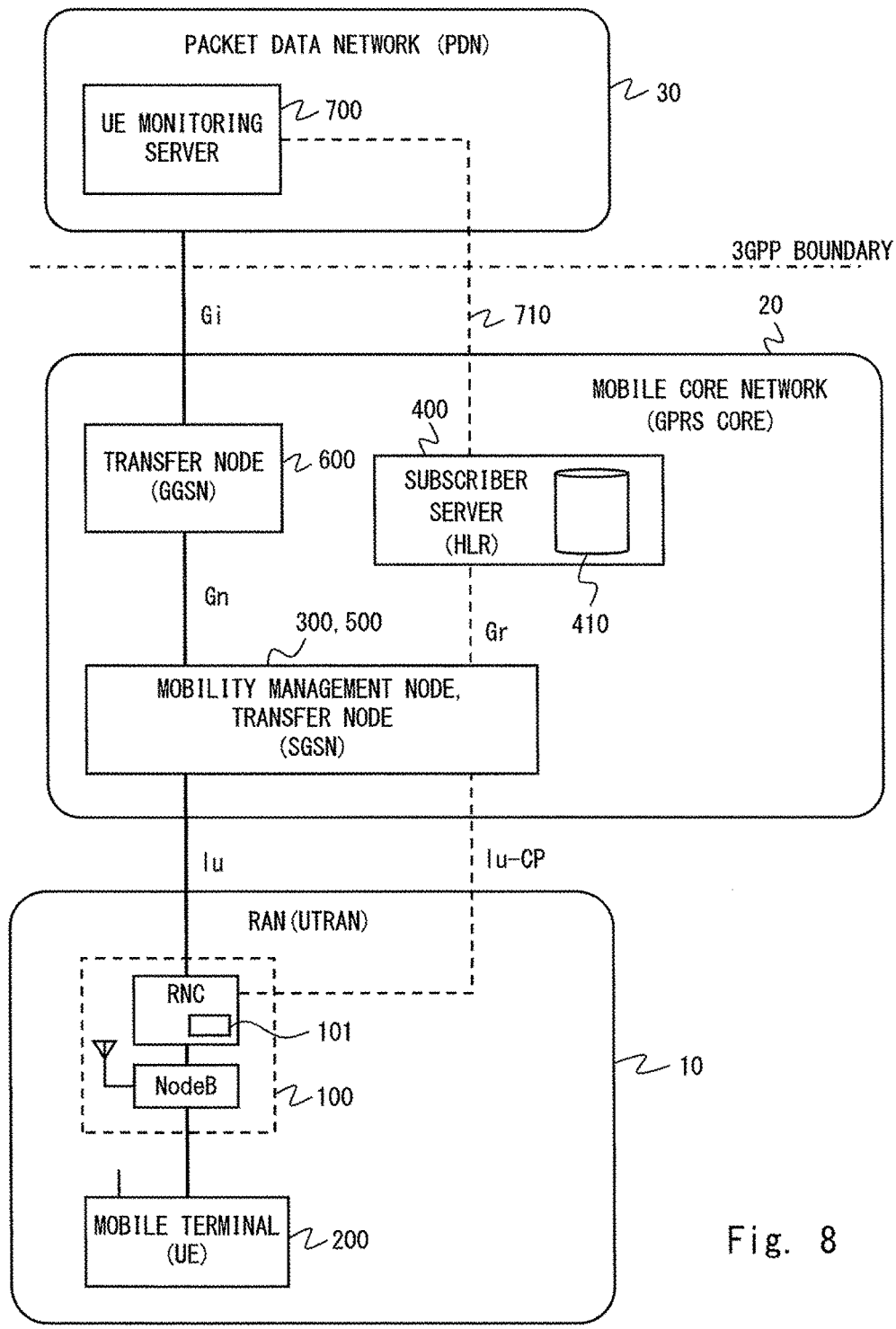
FIG. 8 is a block diagram showing a configuration example of a mobile communication system according to an embodiment of the present invention.

FIG. 8 shows a configuration example of the UMTS network. In the example shown in FIG. 8, the RNC and the NodeB correspond to the base station 100. In the example shown in FIG. 8, the SGSN control plane function corresponds to the mobility management node 300, and the SGSN user plane function corresponds to the transfer node 500. Further, the HLR corresponds to the subscriber server 400, and the GGSN corresponds to the transfer node 600.

Figure 9:
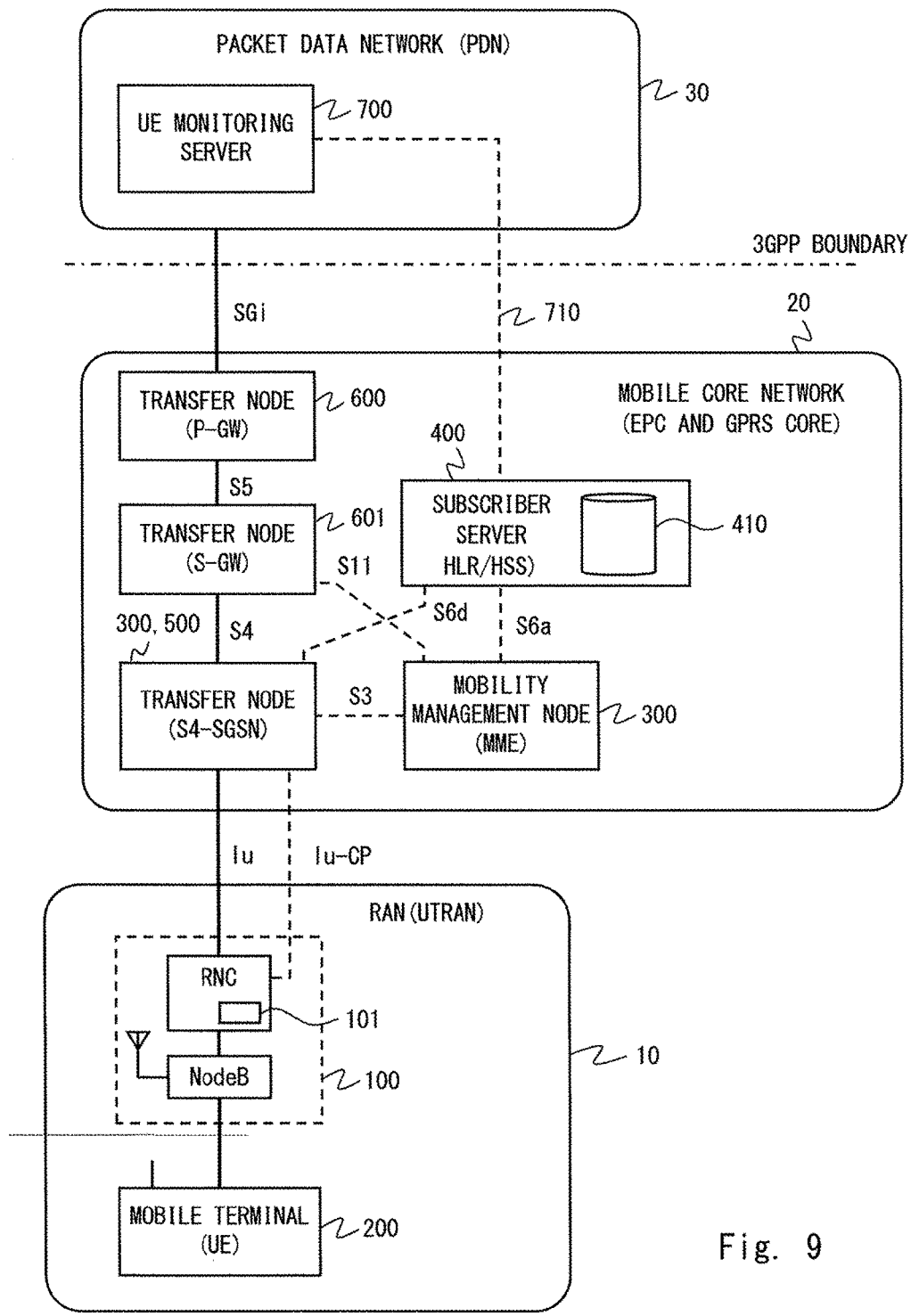
FIG. 9 is a block diagram showing a configuration example of a mobile communication system according to an embodiment of the present invention.

FIG. 9 shows a configuration example of a network in which the EPS and the UMTS are combined. In the example shown in FIG. 9, the mobile terminal 200 is connected to the UTRAN and communicates with the PDN 30 through the S4-SGSN and the EPC. In the example shown in FIG. 9, the RNC and the NodeB thus correspond to the base station 100. In the example shown in FIG. 9, the MME and the control plane function of the S4-SGSN correspond to the mobility management node 300. Further, the HLR/HSS corresponds to the subscriber server 400, and the P-GW corresponds to the transfer node 600. The transfer node 601 corresponding to the S-GW shown in FIG. 9 relays user data between the transfer node 500 (SGSN) and the transfer node 600 (P-GW).

Further, the mobile terminal 200, the behavior data collection application program 210, and the UE monitoring server 700 described in the first embodiment may be used for various purposes. Further, the combination of the behavior data and the item of the subscriber data 410 updated according to the behavior data may be changed as appropriate depending on the utilization purpose. For example, the behavior data collection application program 210 may be an open mobile alliance-device management (OMA-DM) client and the UE monitoring server 700 may be an OMA-DM server. Alternatively, the behavior data collection application program 210 may be an MTC client and the UE monitoring server 700 may be an MTC server. Further, the mobile terminal 200 may serve as a virtual switch, e.g., OpenFlow Switch, and the UE monitoring server 700 may be an OpenFlow controller. When the mobile terminal 200 serves as the OpenFlow Switch, the mobile terminal 200 transmits the behavior data to the UE monitoring server 700 using a Packet_in message or the like, for example.

The UE monitoring server 700 may be a server having an Access Network Discovery and Selection Function (ANDSF). The ANDSF communicates with the mobile terminal 200 on an application layer using an S14 interface. The ANDSF provides to the mobile terminal 200 information (e.g., Inter-system mobility policy, Access network discovery information, Inter-System Routing Policy) that is necessary to search and select a non-3GPP access network (e.g., wireless LAN, WiMAX). In this case, the mobile terminal 200 transmits the behavior data to the UE monitoring server 700 through the S14 interface. The detail of the ANDSF is described in the section 4.8 of 3GPP TS 23.402 V11.2.0 (2012-03).

Further, the present invention is not limited to the embodiments stated above, and it will be obvious that various modifications may be made therein without departing from the spirit of the present invention described above.

This application is based upon and claims the benefit of priority from Japanese Patent Application No. 2012-067229, filed on Mar. 23, 2012, the disclosure of which is incorporated herein in its entirety by reference.

REFERENCE SIGNS LIST

10 RADIO ACCESS NETWORK
20 MOBILE CORE NETWORK
30 PACKET DATA NETWORK
100 BASE STATION
101 UE INACTIVITY TIMER
200 MOBILE TERMINAL
201 RADIO COMMUNICATION UNIT
202 PROCESSOR
203 MICROPHONE
204 SPEAKER
205 TOUCH PANEL
206 DISPLAY
207 CAMERA
208 NON-VOLATILE STORAGE
209 OPERATING SYSTEM
210 BEHAVIOR DATA COLLECTION APPLICATION
300 MOBILITY MANAGEMENT NODE
400 SUBSCRIBER SERVER
401 MONITORING SERVER COMMUNICATION UNIT
402 MME COMMUNICATION UNIT
403 UPDATE UNIT
410 SUBSCRIBER DATA
411 TIMER CONFIGURATION DATA
500 TRANSFER NODE
600 TRANSFER NODE
601 TRANSFER NODE
700 UE MONITORING SERVER
701 BEHAVIOR DATA ACQUIRING UNIT
702 SUBSCRIBER SERVER COMMUNICATION UNIT
710 CONTROL INTERFACE (REFERENCE POINT)

The invention claimed is:

1. A home subscriber server comprising:
a transceiver configured to receive first information related to communication of a mobile terminal; and
a processor configured to store the first information as part of subscriber data of the mobile terminal,
wherein the transceiver sends the first information to a mobile management node, and
wherein the first information is used to determine second information related to changes between a CONNECTED state and an IDLE state of the mobile terminal.

2. The home subscriber server according to claim 1, wherein the subscriber data comprises a radio control parameter of a radio access network regarding the mobile terminal.

3. The home subscriber server according to claim 1, wherein the second information is related to start of discontinuous reception (DRX) in the CONNECTED state.

4. The home subscriber server according to claim 1, wherein the transceiver receives an update request message including the first information.

5. The home subscriber server according to claim 1, wherein the first information comprises a parameter regarding a communication of the mobile terminal.

6. The home subscriber server according to claim 1, wherein the first information comprises data indicating a communication protocol used by the mobile terminal when performing communication through a radio access network and a mobile core network.

7. The home subscriber server according to claim 1, wherein the first information comprises data indicating an interval of communication of the mobile terminal.

8. The home subscriber server according to claim 1, wherein the first information comprises data indicating an application program installed in the mobile terminal.

9. The home subscriber server according to claim 1, wherein the first information comprises data indicating an application program activated in the mobile terminal.

10. The home subscriber server according to claim 1, wherein the first information comprises data indicating an amount of communication traffic of the mobile terminal.

11. The home subscriber server according to claim 1, wherein the home subscriber server is arranged outside a radio access network and a mobile core network.

12. A monitoring server comprising:
a processor configured to detect a change of first information related to communication of a mobile terminal; and
a transceiver configured to transmit the first information that is to be stored as part of subscriber data of the mobile terminal by a home subscriber server, the subscriber data comprising configuration information of a timer, wherein:
the timer measures duration time of an inactive state during which user data regarding the mobile terminal is neither transmitted nor received, is started by a base station arranged in a radio access network, and is used to determine change of a state of the mobile terminal from a CONNECTED state to an IDLE state; and
the transceiver communicates with the home subscriber server to update the configuration information of the timer.

13. The monitoring server according to claim 12, wherein the monitoring server is arranged outside both of the radio access network and a mobile core network.

14. The monitoring server according to claim 12, wherein the processor detects the change of the first information by communicating with the mobile terminal transparently on an application layer which is not terminated by the radio access network and a mobile core network.

15. The monitoring server according to claim 12, wherein the transceiver transmits an update request message including the first information.

16. The monitoring server according to claim 12, wherein the first information is used to determine information regarding activity behavior of the mobile terminal.

17. The monitoring server according to claim 12, wherein the timer is started by the mobile terminal and is used to determine start of discontinuous reception (DRX) in the CONNECTED state.

18. The monitoring server according to claim 12, wherein
the subscriber data comprises at least one of an address used by the mobile terminal when communicating with an external network and an access point name indicating an external network to which the mobile terminal is permitted to connect, and
the transceiver communicates with the home subscriber server to update at least one of the address and the access point name.

19. The monitoring server according to claim 12, wherein
the subscriber data comprises a QoS parameter of a bearer configured in the radio access network and a mobile core network, and
the transceiver communicates with the home subscriber server to update the QoS parameter.

20. The monitoring server according to claim 12, wherein the first information comprises data indicating a node or a network with which the mobile terminal communicates through the radio access network and a mobile core network.

21. The monitoring server according to claim 12, wherein the first information comprises data indicating a communication protocol used by the mobile terminal when performing communication through the radio access network and a mobile core network.

22. The monitoring server according to claim 12, wherein the first information comprises data indicating an interval of communication of the mobile terminal.

23. The monitoring server according to claim 12, wherein the first information comprises data indicating an application program installed in the mobile terminal.

24. The monitoring server according to claim 12, wherein the first information comprises data indicating an application program activated in the mobile terminal.

25. The monitoring server according to claim 12, wherein the first information comprises data indicating an amount of communication traffic of the mobile terminal.

26. A mobile terminal being connected to a mobile core network through a radio access network, the mobile terminal comprising:
   a transceiver configured to transmit first information related to communication of the mobile terminal to a monitoring server, the first information being used to update subscriber data regarding the mobile terminal managed by a home subscriber server arranged in the mobile core network, the subscriber data comprising configuration information of a timer, wherein:
      the timer measures duration time of an inactive state during which user data regarding the mobile terminal is neither transmitted nor received, is started by a base station arranged in the radio access network, and is used to determine change of a state of the mobile terminal from a CONNECTED state to an IDLE state; and
      the first information is used to update the configuration information of the timer.

27. The mobile terminal according to claim 26, wherein the subscriber data comprises a radio control parameter of the radio access network regarding the mobile terminal, and
   the first information is used to update the radio control parameter.

28. The mobile terminal according to claim 26, wherein the timer is started by the mobile terminal and is used to determine start of discontinuous reception (DRX) in the CONNECTED state.

29. The mobile terminal according to claim 26, wherein the subscriber data comprises at least one of an address used by the mobile terminal when communicating with an external network and an access point name indicating the external network to which the mobile terminal is permitted to connect, and
   the first information is used to update at least one of the address and the access point name.

30. The mobile terminal according to claim 26, wherein the subscriber data comprises a QoS parameter of a bearer configured in the radio access network and the mobile core network, and
   the first information is used to update the QoS parameter.

31. The mobile terminal according to claim 26, wherein the first information comprises data indicating a node or a network with which the mobile terminal communicates through the radio access network and the mobile core network.

32. The mobile terminal according to claim 26, wherein the first information comprises data indicating a communication protocol used by the mobile terminal when performing communication through the radio access network and the mobile core network.

33. The mobile terminal according to claim 26, wherein the first information comprises data indicating an interval of communication of the mobile terminal.

34. The mobile terminal according to claim 26, wherein the first information comprises data indicating an application program installed in the mobile terminal.

35. The mobile terminal according to claim 26, wherein the first information comprises data indicating an application program activated in the mobile terminal.

36. The mobile terminal according to claim 26, wherein the first information comprises data indicating an amount of communication traffic of the mobile terminal.

37. A method performed by a home subscriber server, the method comprising:
   receiving first information related to communication of a mobile terminal;
   storing the first information as part of subscriber data of the mobile terminal; and
   transmitting the first information to a mobile management node,
   wherein the first information is used to determine second information related to changes between a CONNECTED state and an IDLE state of the mobile terminal.

38. A method performed by a monitoring server, the method comprising:
   detecting a change of first information related to communication of a mobile terminal;
   transmitting the first information that is to be stored as part of subscriber data of the mobile terminal by a home subscriber server, the subscriber data comprising configuration information of a timer, wherein the timer measures duration time of an inactive state during which user data regarding the mobile terminal is neither transmitted nor received, is started by a base station arranged in a radio access network, and is used to determine change of a state of the mobile terminal from a CONNECTED state to an IDLE state; and
   communicating with the home subscriber server to update the configuration information of the timer.

39. A method performed by a mobile terminal connected to a mobile core network through a radio access network, the method comprising transmitting first information related to communication of the mobile terminal to a monitoring server, the first information being used to update subscriber data regarding the mobile terminal managed by a home subscriber server arranged in the mobile core network, the subscriber data comprising configuration information of a timer, wherein:
   the timer measures duration time of an inactive state during which user data regarding the mobile terminal is neither transmitted nor received, is started by a base station arranged in the radio access network, and is used to determine change of a state of the mobile terminal from a CONNECTED state to an IDLE state; and
   the first information is used to update the configuration information of the timer.

40. A non-transitory computer readable medium storing a program for causing a computer to execute a method regarding a home subscriber server, the method comprising:
  receiving first information related to communication of a mobile terminal; and
  storing the first information as part of subscriber data of the mobile terminal; and
  transmitting the first information to a mobile management node,
  wherein the first information is used to determine second information related to changes between a CONNECTED state and an IDLE state of the mobile terminal.

41. A non-transitory computer readable medium storing a program for causing a computer to execute a method performed by a monitoring server, the method comprising:
  detecting a change of first information related to communication of a mobile terminal;
  transmitting the first information that is to be stored as part of subscriber data of the mobile terminal by a home subscriber server, the subscriber data comprising configuration information of a timer, wherein the timer measures duration time of an inactive state during which user data regarding the mobile terminal is neither transmitted nor received, is started by a base station arranged in a radio access network, and is used to determine change of a state of the mobile terminal from a CONNECTED state to an IDLE state; and
  communicating with the home subscriber server to update the configuration information of the timer.

42. A non-transitory computer readable medium storing a program for causing a computer to execute a method performed by a mobile terminal, the mobile terminal being connected to a mobile core network through a radio access network, the method comprising transmitting first information related to communication of the mobile terminal to a monitoring server, the first information being used to update subscriber data regarding the mobile terminal managed by a home subscriber server arranged in the mobile core network, the subscriber data comprising configuration information of a timer, wherein:
  the timer measures duration time of an inactive state during which user data regarding the mobile terminal is neither transmitted nor received, is started by a base station arranged in the radio access network, and is used to determine change of a state of the mobile terminal from a CONNECTED state to an IDLE state; and
  the first information is used to update the configuration information of the timer.

* * * * *